(12) United States Patent
Hirata et al.

(10) Patent No.: US 9,227,239 B2
(45) Date of Patent: Jan. 5, 2016

(54) FORMING DIE APPARATUS AND DIE MEMBER

(71) Applicant: TOYOTA BOSHOKU KABUSHIKI KAISHA, Aichi-ken (JP)

(72) Inventors: Kazuyuki Hirata, Toyota (JP); Taira Ito, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/284,482

(22) Filed: May 22, 2014

(65) Prior Publication Data

US 2014/0352393 A1 Dec. 4, 2014

(30) Foreign Application Priority Data

May 29, 2013 (JP) ................................. 2013-112833

(51) Int. Cl.
*B21D 37/10* (2006.01)
*B21D 37/02* (2006.01)
*B21D 13/02* (2006.01)
*H01M 8/02* (2006.01)

(52) U.S. Cl.
CPC ............... *B21D 37/10* (2013.01); *B21D 13/02* (2013.01); *B21D 37/02* (2013.01); *H01M 8/0202* (2013.01); *H01M 8/0258* (2013.01); *Y02E 60/50* (2013.01)

(58) Field of Classification Search
CPC ........ B21D 13/02; B21D 37/10; B21D 37/02; H01M 8/0202; H01M 8/0258; Y02E 60/50
USPC ........................................................... 72/473
See application file for complete search history.

(56) References Cited

U.S. PATENT DOCUMENTS

| 1,118,046 | A | * | 11/1914 | Poffinbarger | .................... 72/397 |
| 1,272,531 | A | * | 7/1918 | Riley | ............................... 72/396 |
| 4,641,514 | A | * | 2/1987 | Rozmus | .......................... 72/400 |
| 7,086,267 | B2 | * | 8/2006 | Dworak et al. | .................. 72/413 |
| 8,821,147 | B2 | * | 9/2014 | Hasegawa et al. | ........ 425/192 R |

FOREIGN PATENT DOCUMENTS

| DE | 19826813 | 12/1999 |
| JP | 2008-296262 | 12/2008 |

OTHER PUBLICATIONS

U.S. Appl. No. 14/284,462 to Kazuyuki Hirata, which was filed on May 22, 2014.
U.S. Appl. No. 14/284,450 to Kazuyuki Hirata et al., which was filed on May 22, 2014.
German Office Action in counterpart application No. 10 2014 210 061.5, dated Nov. 2, 2015.

* cited by examiner

*Primary Examiner* — David B Jones
(74) *Attorney, Agent, or Firm* — Greenblum & Bernstein, P.L.C.

(57) ABSTRACT

A forming die apparatus includes a first die on which a die surface is formed and a second die for pressing a workpiece placed on the first die. At least one of the first die and the second die is configured by assembling a plurality of die members. Each die member has a concave side surface facing another die member.

9 Claims, 6 Drawing Sheets

FORMING DIE APPARATUS AND DIE MEMBER

BACKGROUND OF THE INVENTION

The present invention relates to a forming die apparatus that presses a workpiece using two dies that are brought toward and away from each other and to a die member of the forming die apparatus.

Figure 6:
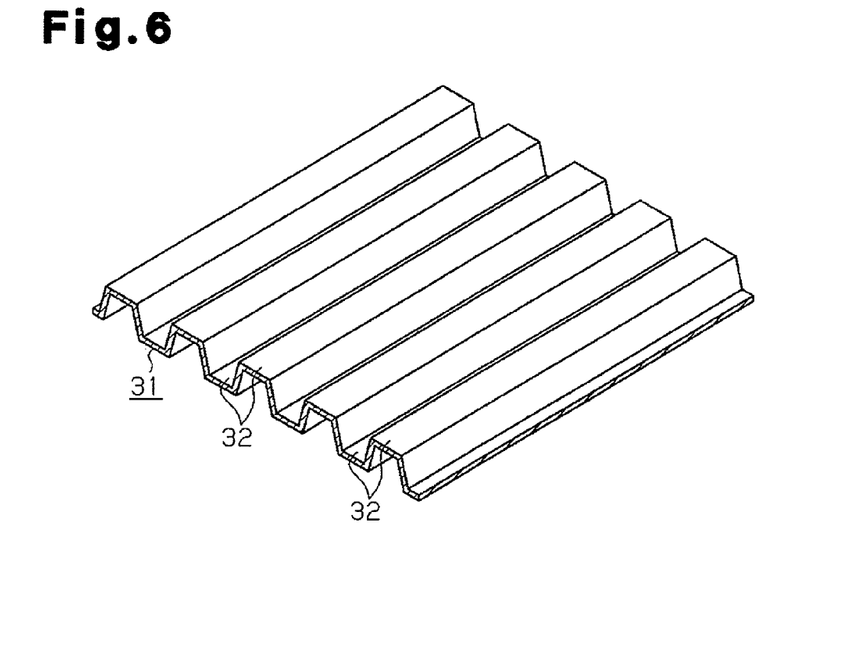
FIG. 6 is a perspective view illustrating a part of a typical separator for a fuel cell.

Typically, separators used in fuel cells are formed by, as shown in FIG. 6, providing a plate 31 made of a corrosion-resistance metal, such as titanium, with contiguous grooves and protrusions 32. The grooves and protrusions 32 define passages thorough which coolant or gas of hydrogen or oxygen flows.

Figure 7:
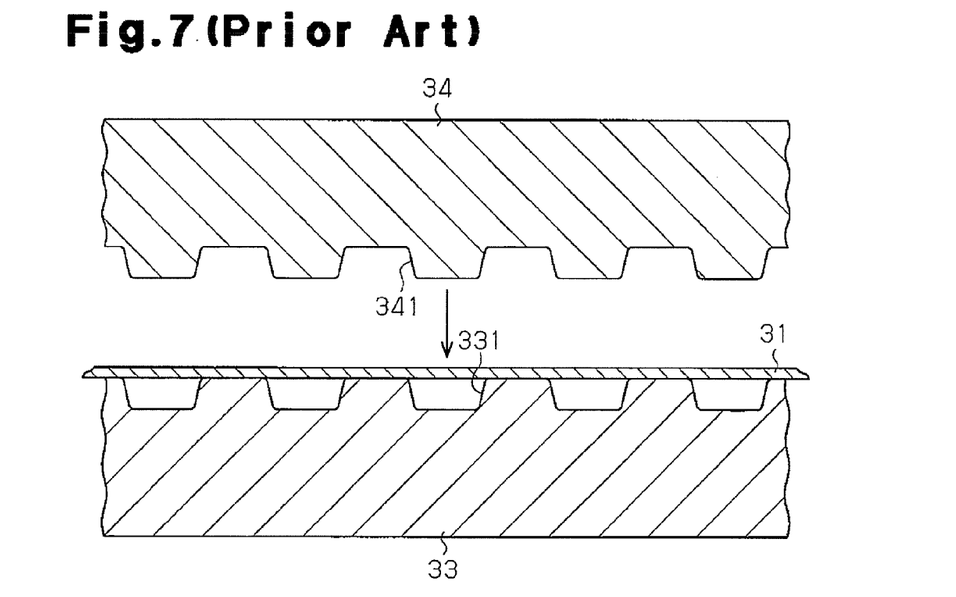
FIG. 7 is a cross-sectional view illustrating a conventional forming die apparatus for forming the fuel cell separator of FIG. 6.

When forming such a separator for a fuel cell, a forming die apparatus as shown in FIG. 7 is conventionally used, for example. The forming die apparatus includes a lower die 33 and an upper die 34. The lower die 33 has on the upper surface a die surface 331 with grooves and protrusions, and the upper die 34 has on the lower surface a die surface 341 on which grooves and protrusions are formed to correspond to the die surface 331 of the lower die 33. The upper die 34 is arranged above the lower die 33 to be brought toward and away from the lower die 33. With a plate 31, which is a workpiece, placed on the die surface 331 of the lower die 33, the upper die 34 is brought toward the lower die 33 to press the plate 31 between the die surfaces 331, 341 of the dies 33, 34, so that the grooves and protrusions 32 are formed on the plate 31.

When producing the lower die 33 and the upper die 34 of the forming die apparatus, the surface of a die material made of super hard metal, such as high-speed steel, is cut to form the die surfaces 331, 341 having grooves and protrusions. When forming the die surfaces 331, 341, a cutting tool is used to cut the die material along a direction in which the grooves and protrusions on the die surfaces 331, 341 extend. Since the die material is made of super hard metal, the cutting tool becomes dull at an early point due to wear. Thus, it is difficult to continuously cut a long distance in the extending direction of the grooves and protrusions on the die surfaces 331, 341. If a worn cutting tool is replaced by a new cutting tool in the middle of cutting operation, the shape of a surface being cut significantly changes between before and after the replacement. This is highly likely to degrade the accuracy of the die surfaces 331, 341.

Figure 8:
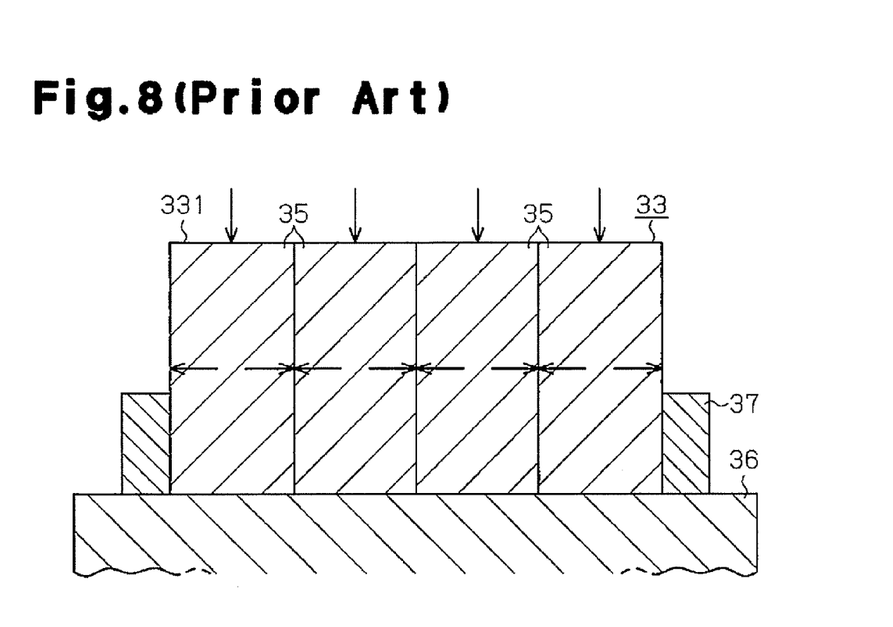
FIG. 8 is a cross-sectional view illustrating a lower die in another conventional forming die apparatus.

To deal with such a problem, a forming die apparatus as illustrated in FIG. 8 has conventionally been proposed. The forming die apparatus has a lower die 33 formed by die members 35, which are separate rectangular columns. The die members 35 are assembled on a base 36 and fitted in a frame 37. According to this configuration, limited parts of the end faces of the die members 35 are cut individually. Thus, problems due to wear of the cutting tool are less likely to occur. In addition, the die surface 331 with grooves and protrusions can be easily formed by joining the cut surfaces. Although not illustrated, the upper die of the forming die apparatus is configured by assembling die members as in the case of the lower die 33.

On the other hand, Japanese Laid-Open Patent Publication No. 2008-296262 discloses a press machine of die-quench method, in which heated steel material is pressed by upper and lower dies. The lower die of the press machine is formed by separate die blocks, so that expansion and contraction of the lower die as a whole due to temperature changes are suppressed. The die blocks are arranged side by side on a base with a clearance between the die blocks. In press operation, thermal expansion of the die blocks is absorbed by the clearances between the die blocks.

SUMMARY OF THE INVENTION

However, the forming die apparatus of FIG. 8 and the press machine of Japanese Laid-Open Patent Publication No. 2008-296262 have the following shortcomings.

Figure 9:
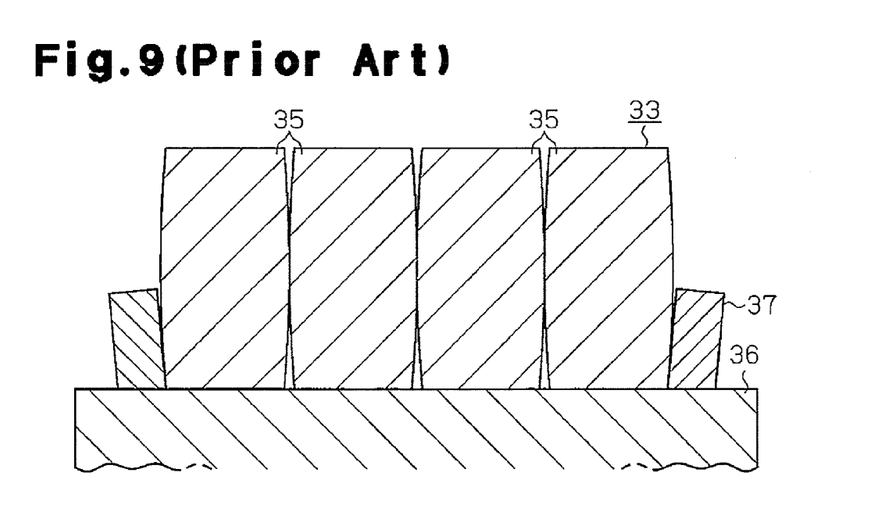
FIG. 9 is a cross-sectional view illustrating the lower die of FIG. 8 in which the die members are in a deformed state.

That is, when pressing a workpiece using this type of forming die apparatus or press machine, a great pressing force acts on dies. In the case of the forming die apparatus of FIG. 8, the die members 35 of the lower die 33 receive a great pressing force from above. This can deform the die members 35 so that the side surfaces thereof expand outward, as shown in FIG. 9. As a result, the die members 35 and the frame 37 may strike each other and be damaged.

In the press machine disclosed in Japanese Laid-Open Patent Publication No. 2008-296262, it is difficult to maintain the accuracy of the die surface since the die blocks in the lower die cannot be easily positioned on the base while maintaining clearances between the die blocks without causing any displacement.

Accordingly, it is an objective of the present invention to provide a forming die apparatus that is capable of accurately positioning die members and allowing the die members to be deformed to expand outward when the die members receive a great pressing force during pressing of a workpiece. Another objective of the present invention is to provide such a die member.

To achieve the foregoing objective and in accordance with one aspect of the present invention, a forming die apparatus is provided that includes a first die having an end face on which a die surface is formed and a second die for pressing a workpiece placed on the first die. At least one of the first die and the second die is configured by assembling a plurality of die members. Each die member has a concave side surface facing another die member.

In accordance with another aspect of the present invention, a die member is provided that is one of a plurality of die members, which are assembled to configure a die of a forming die apparatus. The die member has an end face on which a die surface is formed and a concave side surface that faces another die member.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

A forming die apparatus and a die member according to one embodiment of the present invention will now be described with reference to FIGS. 1 to 5.

Figure 2:
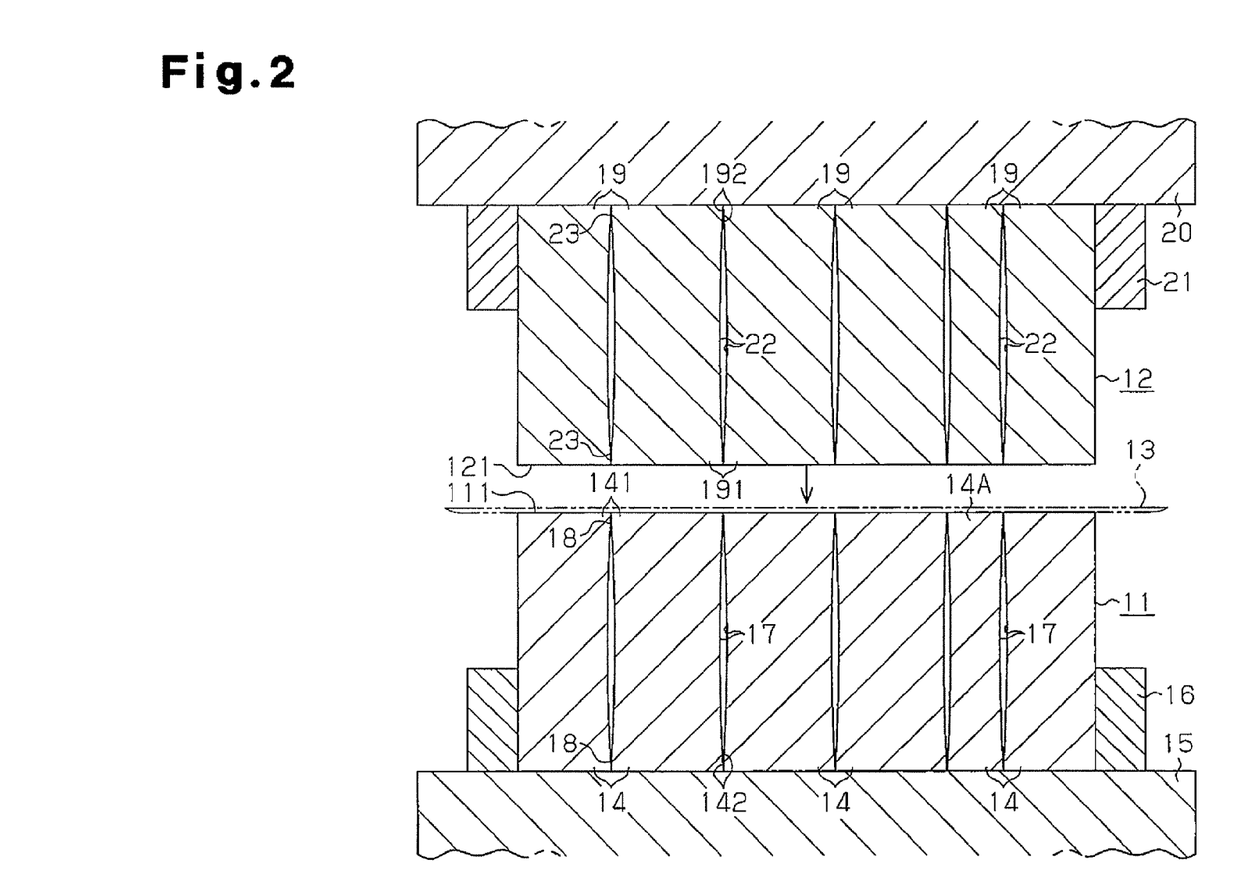
FIG. 2 is a cross-sectional view illustrating a forming die apparatus according to the embodiment.

As shown in FIG. 2, the forming die apparatus of the present embodiment includes a first die 11, which has on the upper surface a die surface 111 with grooves and protrusions, and a second die 12, which is arranged above the first die 11 and can be brought toward and away from the first die 11. The second die 12 has on the lower surface a die surface 121, which has grooves and protrusions corresponding to the shape of the die surface 111 of the first die 11. With a workpiece 13 placed on the die surface 111 of the first die 11, the second die 12 is brought toward the first die 11, so that the workpiece 13 is pressed between the die surfaces 111, 121 of the dies 11, 12 to have a predetermined shape with grooves and protrusions as shown in FIG. 6.

Figure 1:
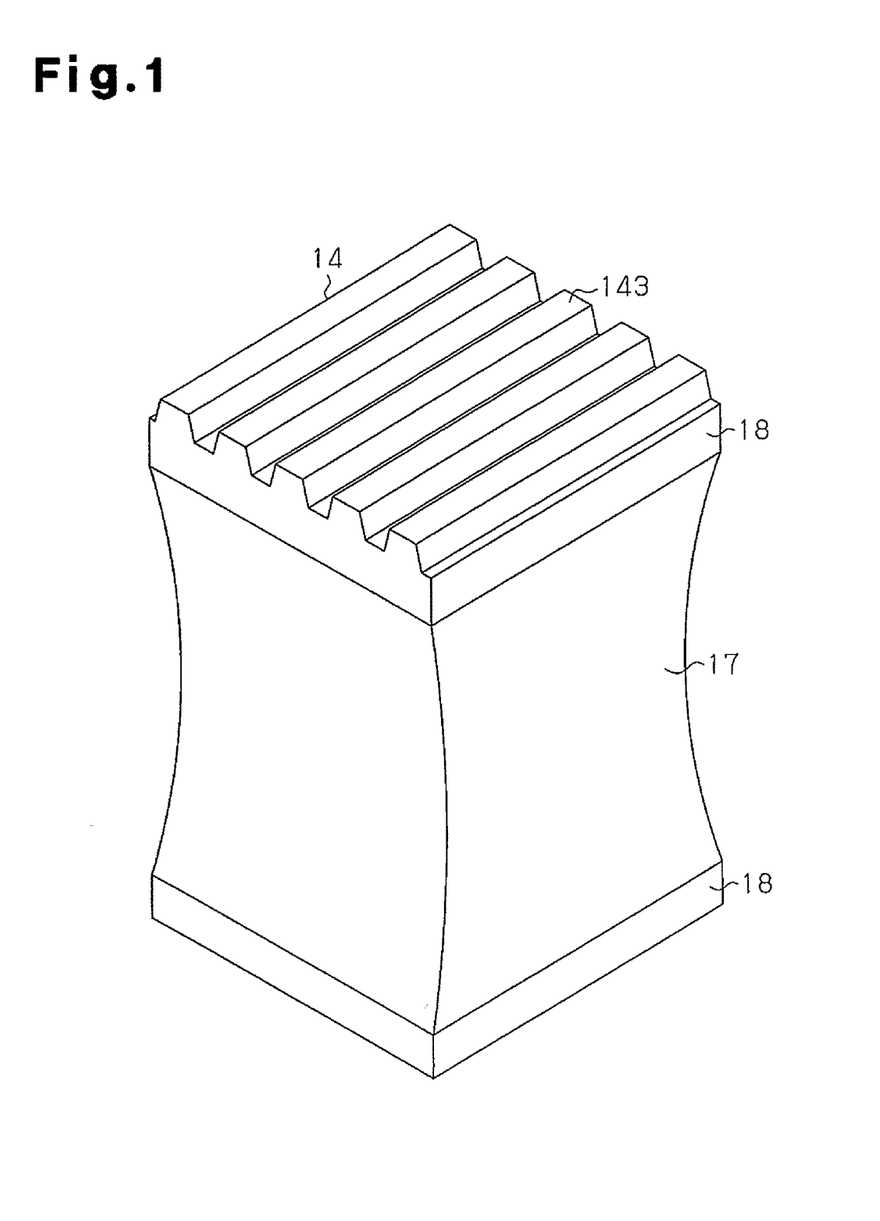
FIG. 1 is a perspective view illustrating a die member according to one embodiment of the present invention.
Figure 3:
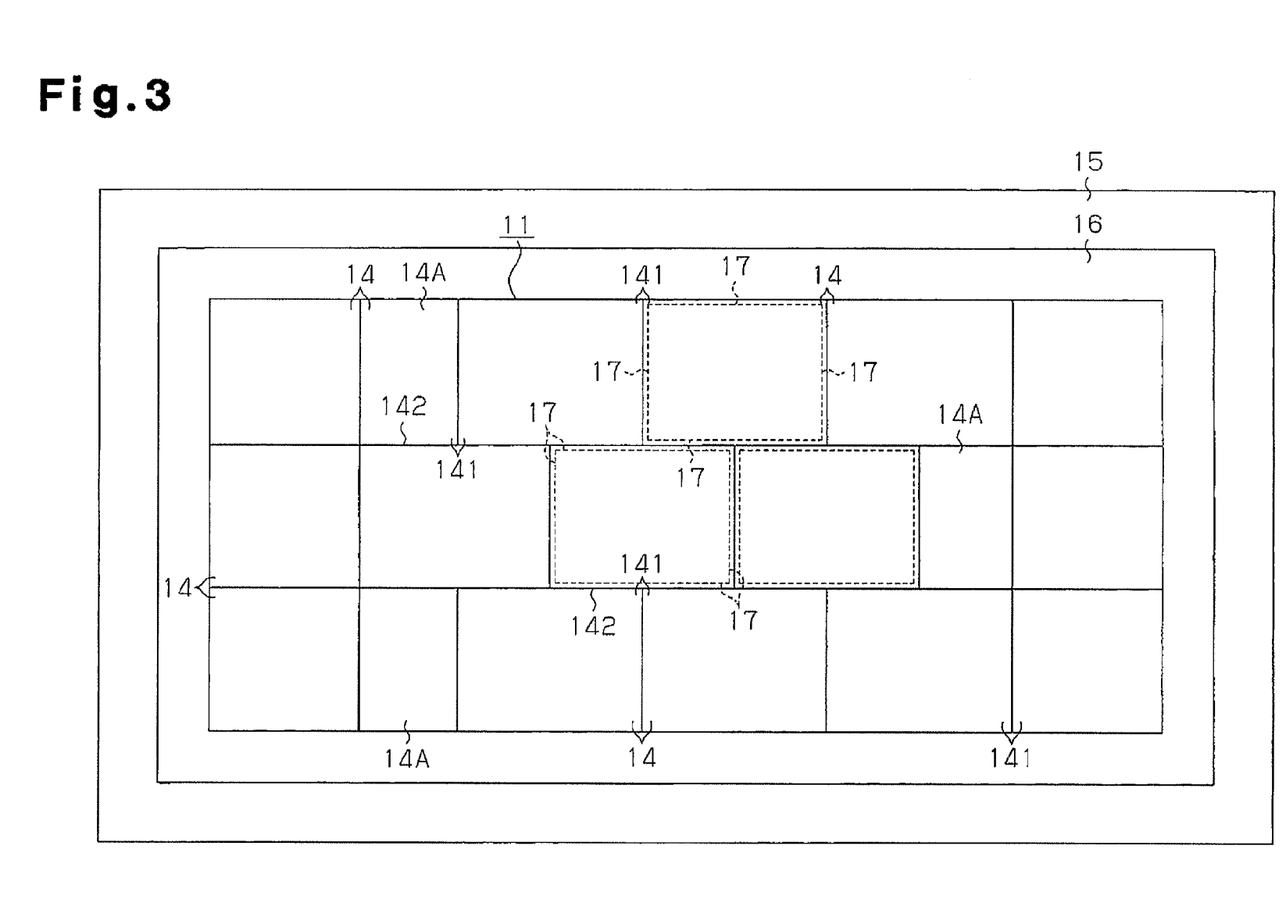
FIG. 3 is a plan view illustrating a first die in the forming die apparatus of FIG. 2.

As illustrated in FIGS. 1 to 3, the first die 11 is formed by die members 14, which are separate rectangular columns. The die members 14 are assembled on a base 15 and fitted in a frame 16, which has an oblong rectangular shape as viewed from above. The die members 14 form multiple rows (three in the present embodiment) arranged in a direction parallel to the short sides of the frame 16, in other words, arranged in the transverse direction of the frame 16. The corner sections 141 of each die member 14 face and contact the corner sections 141 of the adjacent die members 14 in the same row.

Each row of the die members 14 includes a die member 14A, which is a die member 14 having a different measurement in the extending direction of the row. The corner sections 141 of the die members 14 that are located in a central part of the first die 11, which receives a particularly great pressing force during pressing of the workpiece 13, are arranged to face the side surfaces 142 of the die members 14 in the adjacent rows. That is, the corner sections 141 of die members 14 in the center row are arranged to face the side surfaces 142 of the adjacent die members 14 in the other rows.

As shown in FIGS. 1 to 4, the four side surfaces 142 of each of the die members 14 that do not contact the frame 16 are each formed by a concave portion 17, a center in the vertical direction of which is recessed inward, and two flat portions 18 located at the upper and lower ends in the side surface 142. Of the side surfaces of the die members 14 that contact the frame 16, the side surfaces facing the frame 16 are flat. However, the side surfaces that do not face the frame 16 are each formed by a concave portion 17, a center in the vertical direction of which is recessed inward, and two flat portions 18 located at the upper and lower ends in the side surface. The upper end face of each die member 14 is a forming face 143 having grooves and protrusions. Of each adjacent pair of the die members 14, the concave portions 17 formed in the facing side surfaces 142 are arranged to face each other, and the flat portions 18 of the same side surfaces 142 are held in area contact with each other.

As illustrated in FIG. 2, the second die 12 is also formed by die members 19, which are separate rectangular columns, like the first die 11. The die members 19 are assembled on the lower surface of a support plate 20 and fitted in a frame 21. The arrangement of the die members 19 in the frame 21 is substantially the same as the arrangement of the die members 14 in the frame 16 of the first die 11. That is, the corner sections 191 of the die members 19 that are located in a central part of the second die 12 are arranged to face the side surfaces 192 of die members 19 in the adjacent rows. The side surfaces 192 of the die members 19 that do not face the frame 21 are each formed by a concave portion 22, a center in the vertical direction of which is recessed inward, and two flat portions 23 located at the upper and lower ends in the side surface. Each die member 19 has a lower end face having a shape with grooves and protrusions that are complementary with the forming face 143 of the corresponding die member 14 in the first die 11.

Operation of the forming die apparatus will now be described.

In the forming die apparatus, the first die 11 and the second die 12 are each formed by assembly of multiple die members 14, 19. Therefore, by cutting limited parts of the end faces of the die members 14, 19 individually and then assembling the die members 14, 19, the die surfaces 111, 121 of the first die 11 and the second die 12, which have grooves and protrusions, are formed through joining the cut surfaces. Thus, even in a case in which the dies 11, 12 are made of super hard metal, such as high-speed steel, the die surfaces 111, 121 can be formed without any difficulty.

Figure 5:
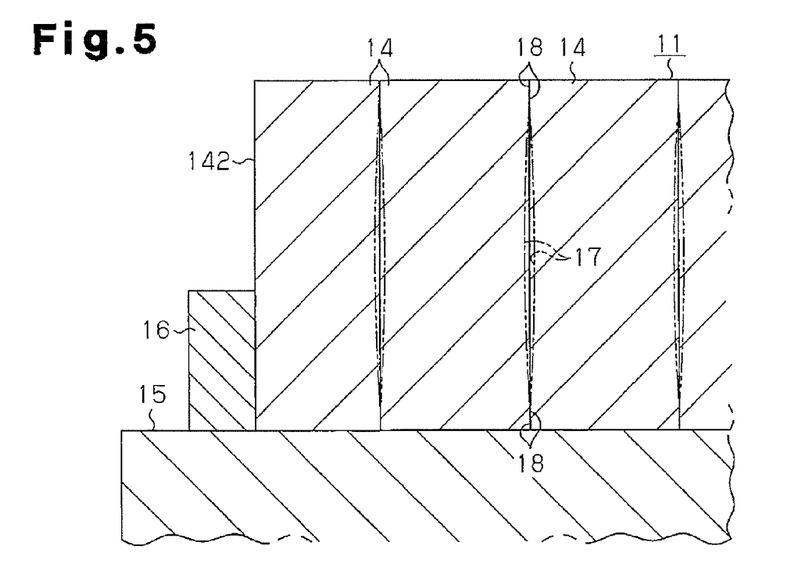
FIG. 5 is a cross-sectional view illustrating the part of the first die in which the die members shown in FIG. 4 are in a deformed state.

During operation of the forming die apparatus, with the workpiece 13 placed on the first die 11 as shown in FIG. 2, the second die 12 is moved toward the first die 11, so that the workpiece 13 is pressed against the die surface 111 of the first die 11. The workpiece 13 is thus pressed to have a shape with grooves and protrusions. During pressing of the workpiece 13, each die member 14 of the first die 11 receives a great pressing force so that the side surfaces 142 of the die member 14 expand outward. At this time, since the side surfaces 142 of each die member 14 that face the side surfaces 142 of the other die members 14 each have a concave portion 17, the expanding deformation of the side surfaces 142 of the die member 14 is absorbed by the concave portions 17. Therefore, outward force caused by deformation of each die member 14 does not act on the frame 16 adversely.

Further, during pressing of the workpiece 13, each die member 19 of the second die 12 receives reaction force of the pressing force so that the side surfaces 192 of the die member 19 expand outward. At this time, since the side surfaces 192 of each die member 19 that face the side surfaces 192 of the other die members 19 each have a concave portion 22, the expanding deformation of the side surfaces 192 of the die member 19 is absorbed by the concave portions 22, as in the case of the first die 11. This reduces the possibility that the die members 19 adjacent to each other strike each other or that outward force due to deformation of the die members 19 act on the frame 21 to lower the accuracy of the pressing.

Further, during pressing of the workpiece 13, great pressing force and reaction force act particularly on the central parts of the dies 11, 12. The corner sections 141, 191 of the die members 14, 19 that are located in the central parts are arranged to face the side surfaces 142, 192 of the die members 14, 19 in the adjacent rows. This prevents the corner sections 141, 191 of the die members 14, 19 that are adjacent to each other from being pressed against each other.

The present embodiment therefore has the following advantages.

(1) The forming die apparatus includes the first die 11, which has the die surface 111 on an end face, and a second die 12 for pressing a workpiece 13 placed on the first die 11 against the die surface 111. The first die 11 is formed by assembling the multiple die members 14. Each die member 14 of the first die 11 has concave side surfaces 142 facing other die members 14. Specifically, the side surfaces 142 of each die member 14 that face the side surfaces 142 of the other die members 14 each have a concave portion 17.

Therefore, by cutting the end faces of the die members 14 individually and then assembling the die members 14, the die surface 111 of the first die 11, which have grooves and protrusions, is formed through joining the cut surfaces. Thus, even in a case in which the first die 11 is made of super hard metal, such as high-speed steel, the die surface 111 of the first die 11 can be formed without any difficulty. Further, during pressing of the workpiece 13, when each die member 14 of the first die 11 receives a great pressing force and deformed to expand outward, the deformation is absorbed by the concave portions 17 of the die members 14. Therefore, outward force caused by deformation of each die member 14 is prevented from acting on the frame 16 and the other members adversely. That is, the die members 14 are allowed to be deformed without any problem.

(2) The second die 12 of the forming die apparatus is formed by assembling the multiple die members 19. Each die member 19 of the second die 12 has concave side surfaces 192 facing other die members 19. Specifically, the side surfaces 192 of each die member 19 that face the side surfaces 192 of the other die members 19 each have a concave portion 22. Thus, as in the case of the first die 11, even in a case in which the second die 12 is made of super hard metal, such as high-speed steel, the die surface 121 of the second die 12 can be formed without any difficulty. Also, during pressing of the workpiece 13, even if each die member 19 of the second die 12 is deformed to expand outward due to the reaction force of the pressing force, outward force caused by deformation of each die member 19 is prevented from acting on the frame 21 and the other members adversely. That is, the die members 19 are allowed to be deformed without any problem.

(3) The die members 14, 19 are formed as rectangular columns. The corner sections 141, 191 of the die members 14, 19 that are located in central parts of the dies 11, 12 are arranged to face the side surfaces 142, 192 of the die members 14, 19 in the adjacent rows. Therefore, when the die members 14, 19 receive a great pressing force and are deformed to expand outward during pressing of the workpiece 13, the corner sections 141, 191 of the die members 14, 19 are prevented from being pressed against the corner sections 141, 191 of adjacent die members 14, 19. That is, concentration of great stress and accompanying drawbacks are avoided.

(4) The die members 14 form multiple rows arranged in the transverse direction of the frame 16. The corner sections 141 of each die member 14 face and contact the corner sections 141 of the adjacent die members 14 in the same row. The corner sections 141 of the die members 14 that are located in the central part of the first die 11 are arranged to face the side surfaces 142 of the die members 14 in the adjacent rows. It is therefore possible to eliminate disadvantages that would be caused when the corner sections 141 of two die members 14 in different rows were pressed against each other.

Likewise, the die members 19 form multiple rows arranged in the transverse direction of the frame 21. The corner sections 191 of each die member 19 face and contact the corner sections 191 of the adjacent die members 19 in the same row. The corner sections 191 of the die members 19 that are located in the central part of the second die 12 are arranged to face the side surfaces 192 of the die members 19 in the adjacent rows. It is therefore possible to eliminate disadvantages that would be caused when the corner sections 191 of two die members 19 in different rows were pressed against each other.

Figure 4:
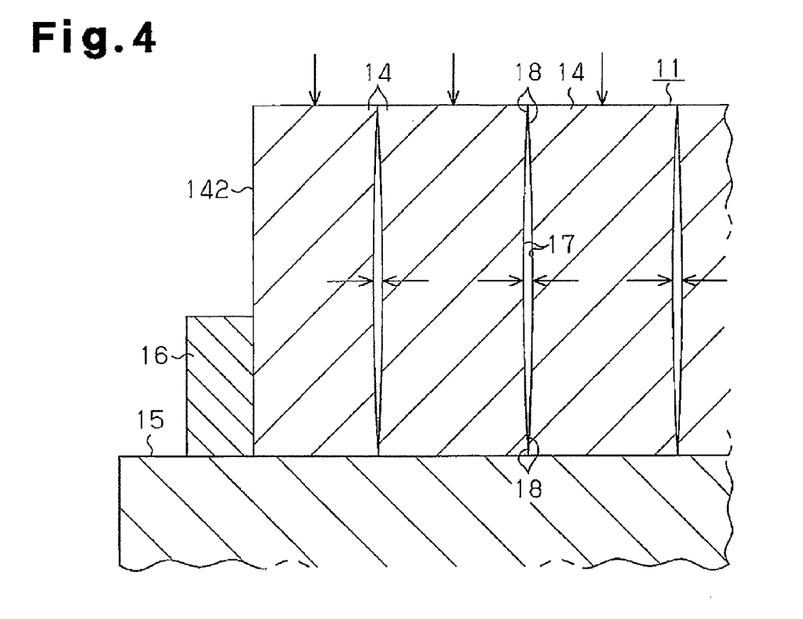
FIG. 4 is a cross-sectional view illustrating a part of the first die of FIG. 2.

(5) The flat portions 18, which can be held in area contact with the adjacent die members 14, 19, are formed in the upper and lower ends of the side surfaces of the die members 14, 19. Therefore, even if the die members 14, 19 or the frame 16 receive a great pressing force during pressing of the workpiece 13, the die members 14, 19 are prevented from being displaced, so that the high accuracy of the pressing is ensured.

The above described embodiment may be modified as described below.

The die members 14, 19 of the dies 11, 12 may have any polygonal shapes, such as hexagonal column shapes.

Of the die members 14 in each of the rows, not only the corner sections 141 of the die members 14 at the center but also the corner sections 141 of all the other die members 14 may be configured to face the side surfaces 142 of the die members 14 in the adjacent rows.

Only one of the first and second dies 11, 12 may be formed by assembling multiple die members.

Of the side surfaces of the die members 14 that contact the frame 16, the side surfaces facing the frame 16 do not necessarily need to be flat. Instead, these side surfaces each may be formed by a concave portion, a center in the vertical direction of which is recessed inward, and two flat portions located at the upper and lower ends in the side surface and capable of being held in area contact with the frame 16. In this case, the frame 16 is prevented from receiving outward force generated by deformation of the die members 14 at positions contacting the frame 16.

Of the side surfaces of the die members 19 that contact the frame 21, the side surfaces facing the frame 21 do not necessarily need to be flat. Instead, these side surfaces each may be formed by a concave portion, a center in the vertical direction of which is recessed inward, and two flat portions located at the upper and lower ends in the side surface and capable of being held in area contact with the frame 21. In this case, the frame 21 is prevented from receiving outward force generated by deformation of the die members 19 at positions contacting the frame 21.

The invention claimed is:

1. A forming die apparatus comprising:
a first die having an end face on which a die surface is formed; and
a second die for pressing a workpiece placed on the first die, wherein
at least one of the first die and the second die is configured by assembling a plurality of die members, and
each die member has adjacent concave side surfaces, with at least one concave side surface facing another die member.

2. The forming die apparatus according to claim 1, wherein the side surface of each of the die members has a flat end portion that can be held in area contact with an end portion of another die member.

3. The forming die apparatus according to claim 1, further comprising a frame into which the die members are fitted,
wherein a die member that is adjacent to the frame has a concave side surface facing the frame.

4. The forming die apparatus according to claim 3, wherein the side surface of the die member adjacent to the frame has a flat end portion that can be held in area contact with the frame.

5. The forming die apparatus according to claim 1, wherein
each die member is formed as a rectangular column and has a corner section, and
the corner section of at least part of the die members is located to face a side surface of an adjacent die member.

6. A forming die apparatus comprising
a first die having an end face on which a die surface is formed; and
a second die for pressing a workpiece placed on the first die, wherein
at least one of the first die and the second die is configured by assembling a plurality of die members, and
each die member has a concave side surface facing another die member, wherein
the die members are arranged in a plurality of rows, and
at least part of the die members has a corner section that is located to face a side surface of an adjacent die member in another row.

7. A die member that is one of a plurality of die members, which are assembled to configure a die of a forming die apparatus,
wherein the die member has an end face on which a die surface is formed and has adjacent concave side surfaces, with at least one concave side surface that faces another die member.

8. The die member according to claim 7, wherein the side surface has a flat end portion that can be held in area contact with an end portion of another die member.

9. The forming die apparatus according to claim 1, wherein the adjacent concave side surfaces share a common concave edge.

\* \* \* \* \*